US011789653B2

(12) United States Patent
Ramesh et al.

(10) Patent No.: US 11,789,653 B2
(45) Date of Patent: Oct. 17, 2023

(54) MEMORY ACCESS CONTROL USING A RESIDENT CONTROL CIRCUITRY IN A MEMORY DEVICE

(71) Applicant: Micron Technology, Inc., Boise, ID (US)

(72) Inventors: Vijay S. Ramesh, Boise, ID (US); Allan Porterfield, Durham, NC (US)

(73) Assignee: Micron Technology, Inc., Boise, ID (US)

( * ) Notice: Subject to any disclaimer, the term of this patent is extended or adjusted under 35 U.S.C. 154(b) by 189 days.

(21) Appl. No.: 17/407,927

(22) Filed: Aug. 20, 2021

(65) Prior Publication Data

US 2023/0055349 A1  Feb. 23, 2023

(51) Int. Cl.
*G06F 3/06* (2006.01)
*G06F 9/455* (2018.01)

(52) U.S. Cl.
CPC .......... *G06F 3/0659* (2013.01); *G06F 3/0604* (2013.01); *G06F 3/068* (2013.01); *G06F 9/45558* (2013.01); *G06F 2009/45583* (2013.01)

(58) Field of Classification Search
CPC ...... G06F 3/0604; G06F 3/061; G06F 3/0611; G06F 3/0613; G06F 3/0659; G06F 3/068; G06F 9/45558; G06F 2009/45583
USPC ........................................................ 711/154
See application file for complete search history.

(56) References Cited

U.S. PATENT DOCUMENTS

| | | | |
|---|---|---|---|
| 8,286,162 B2 | 10/2012 | Neiger et al. | |
| 9,032,181 B2 | 5/2015 | Ahmad et al. | |
| 9,912,752 B1* | 3/2018 | Davis | G06F 16/2365 |
| 10,402,252 B1* | 9/2019 | Habusha | G06F 11/221 |
| 2007/0169172 A1* | 7/2007 | Backes | G06F 12/1466 |
| | | | 711/E12.1 |
| 2007/0288692 A1 | 12/2007 | Bruce et al. | |
| 2011/0167422 A1 | 7/2011 | Eom et al. | |
| 2013/0174148 A1 | 7/2013 | Amit et al. | |

(Continued)

OTHER PUBLICATIONS

L. Liu, S. Yang, L. Peng and X. Li, "Hierarchical Hybrid Memory Management in OS for Tiered Memory Systems," in IEEE Transactions on Parallel and Distributed Systems, vol. 30, No. 10, pp. 2223-2236, Oct. 1, 2019, doi: 10.1109/TPDS.2019.2908175. (Year: 2019).*

(Continued)

*Primary Examiner* — Reginald G Bragdon
*Assistant Examiner* — Aaron D Ho
(74) *Attorney, Agent, or Firm* — Brooks, Cameron & Huebsch, PLLC (57) ABSTRACT

Memory access control, as described herein, can leverage persistent memory to store data that is generally stored in a non-persistent memory. An example method for memory access control can include receiving, by control circuitry resident on a memory device, a memory access request targeting an address of a volatile (e.g., non-persistent) memory component of the memory device and determining characteristics of data associated with the targeted address. The method can further include accessing data at the targeted address of the volatile memory component in response to determining that the characteristics of the data meet a first criterion and accessing data at another address of a non-volatile memory component in response to determining that the characteristics of the data meet a second criterion.

24 Claims, 4 Drawing Sheets

(56) References Cited

U.S. PATENT DOCUMENTS

| | | | |
|---|---|---|---|
| 2016/0127494 A1* | 5/2016 | Liu | G06F 3/0656 709/212 |
| 2016/0266792 A1* | 9/2016 | Amaki | G06F 3/064 |
| 2017/0070574 A1* | 3/2017 | Sawada | G06F 15/167 |
| 2017/0220592 A1 | 8/2017 | Foltz | |
| 2018/0107621 A1* | 4/2018 | Sanghai | G06F 13/24 |
| 2018/0374548 A1* | 12/2018 | Achtenberg | G11C 11/5671 |
| 2021/0225430 A1* | 7/2021 | O | G06F 13/1668 |
| 2022/0094646 A1* | 3/2022 | Padala | H04L 67/1097 |
| 2022/0129379 A1* | 4/2022 | Creed | G06F 12/0871 |

OTHER PUBLICATIONS

Arulraj, J., Pavlo, A., & Malladi, K. T. (2019). Multi-tier buffer management and storage system design for non-volatile memory. arXiv preprint arXiv:1901.10938. (Year: 2019).*

W. Wei, D. Jiang, S. A. McKee, J. Xiong and M. Chen, "Exploiting Program Semantics to Place Data in Hybrid Memory," 2015 International Conference on Parallel Architecture and Compilation (PACT), San Francisco, CA, USA, 2015, pp. 163-173, doi: 10.1109/PACT. 2015.10. (Year: 2015).*

\* cited by examiner

MEMORY ACCESS CONTROL USING A RESIDENT CONTROL CIRCUITRY IN A MEMORY DEVICE

TECHNICAL FIELD

The present disclosure relates generally to semiconductor memory and methods, and more particularly, to memory access control.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), and synchronous dynamic random access memory (SDRAM), among others. Non-volatile memory can provide persistent data by retaining stored data when not powered and can include NAND flash memory, NOR flash memory, and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system.

DETAILED DESCRIPTION

Systems, apparatuses, and methods related to memory access control are described herein. Memory access control, as described herein, can leverage non-volatile and/or persistent memory to store data that is generally stored in a volatile and/or non-persistent memory. An example method for memory access control can include receiving, by control circuitry resident on a memory device, a memory access request targeting an address of a volatile (e.g., non-persistent) memory component of the memory device and determining characteristics of data associated with the targeted address. The method can further include accessing data at the targeted address of the volatile memory component in response to determining that the characteristics of the data meet a first criterion and accessing data at another address of a non-volatile (e.g., persistent) memory component in response to determining that the characteristics of the data meet a second criterion.

Computing systems utilize various types of memory resources during operation. For example, a computing system may utilize a combination of volatile (e.g., random-access memory) memory resources and non-volatile (e.g., storage) memory resources during operation. In general, volatile memory resources can operate at much faster speeds than non-volatile memory resources and can have longer lifespans than non-volatile memory resources; however, volatile memory resources are typically more expensive than non-volatile memory resources. In general, as used herein, a volatile memory resource may be referred to in the alternative as "non-persistent" or as a "non-persistent memory device," while a non-volatile memory resource may be referred to in the alternative as "persistent" or as a "persistent memory device," given the context of the disclosure.

The terms "non-persistent memory device" and "persistent memory device" may be used interchangeably with the terms "non-persistent memory component" and "persistent memory component," particularly in order to clearly distinguish between terms such as "memory device" and the non-persistent and persistent memory components described herein. For example, in some sections of the disclosure, a "memory device" may refer to a collection of hardware components including non-persistent memory devices, persistent memory devices, control circuitry, communication channels, etc. In such scenarios, the terms "non-persistent memory component" and "persistent memory component" may be used to avoid confusion with the overall memory device.

However, a persistent memory device can more broadly refer to the ability to access data in a persistent manner. As an example, in the persistent memory context, the memory device can store a plurality of logical to physical mapping or translation data and/or lookup tables in a memory array in order to track the location of data in the memory device, separate from whether the memory is non-volatile. Further, a persistent memory device can refer to both the non-volatility of the memory in addition to using that non-volatility by including the ability to service commands for successive processes (e.g., by using logical to physical mapping, look-up tables, etc.).

These differing characteristics of persistent and non-persistent memory devices can necessitate trade-offs in computing systems in order to provision a computing system with adequate resources to function in accordance with ever-increasing demands of consumers and computing resource providers. For example, in a multi-user computing network (e.g., a cloud-based computing system deployment, a software defined data center, etc.), a relatively large quantity of volatile memory may be provided to provision virtual machines running in the multi-user network. However, by relying on volatile memory to provide the memory resources to the multi-user network, as is common in some approaches, costs associated with provisioning the network with memory resources may increase, especially as users of the network demand larger and larger pools of computing resources to be made available.

Further, in approaches that rely on volatile memory to provide the memory resources to provision virtual machines in a multi-user network, once the volatile memory resources are exhausted (e.g., once the volatile memory resources are allocated to users of the multi-user network), additional users may not be added to the multi-user network until additional volatile memory resources are available or added. This can lead to potential users being turned away, which can result in a loss of revenue that could be generated if additional memory resources were available to the multi-user network.

Volatile memory resources, such as dynamic random-access memory (DRAM) tend to operate in a deterministic manner while non-volatile memory resources, such as storage class memories (e.g., NAND flash memory devices, solid-state drives, resistance variable memory devices, etc.) tend to operate in a non-deterministic manner. For example, due to error correction operations, encryption operations, RAID operations, etc. that are performed on data retrieved from storage class memory devices, an amount of time between requesting data from a storage class memory device and the data being available can vary from read to read, thereby making data retrieval from the storage class memory device non-deterministic. In contrast, an amount of time between requesting data from a volatile memory device and the data being available can remain fixed from read to read, thereby making data retrieval from a DRAM device deterministic.

In addition, because of the distinction between the deterministic behavior of volatile memory resources and the non-deterministic behavior of non-volatile memory resources, data that is transferred to and from the memory resources generally traverses a particular interface (e.g., a bus) that is associated with the type of memory being used. For example, data that is transferred to and from a DRAM device is typically passed via a double data rate (DDR) bus, while data that is transferred to and from a NAND device is typically passed via a peripheral component interconnect express (PCI-e) bus. As will be appreciated, examples of interfaces over which data can be transferred to and from a volatile memory resource and a non-volatile memory resource are not limited to these specific enumerated examples, however.

Because of the different behaviors of non-volatile memory device and volatile memory devices, some approaches opt to store certain types of data in either volatile or non-volatile memory. This can mitigate issues that can arise due to, for example, the deterministic behavior of volatile memory devices compared to the non-deterministic behavior of non-volatile memory devices. For example, computing systems in some approaches store small amounts of data that are regularly accessed during operation of the computing system in volatile memory devices while data that is larger or accessed less frequently is stored in a non-volatile memory device. However, in multi-user network deployments, the vast majority of data may be stored in volatile memory devices. This can become problematic due to the cost and power consumption of volatile memory devices, both of which may be higher in comparison to non-volatile memory devices. In order to address such issues, embodiments herein can allow for data to be selectively (e.g., intelligently) written to and retrieved from a non-volatile memory device deployed in a multi-user network.

For example, embodiments described herein can allow for data (e.g., data associated with a memory access request generated by a virtual machine) to be monitored to determine characteristics of the data and/or memory access request. As described in more detail, herein, the characteristics of the data can include information related to how frequently such data is accessed (e.g., how frequently memory access requests involving the same or similar data are executed), and/or how long the data is generally stored by a memory device (e.g., how long data that is the same or similar to data indicated by a memory access request is stored by the memory device), among others. Based on these monitored characteristics, the data can be written to a persistent memory device (e.g., a persistent memory component) or a non-persistent memory device (e.g., a non-persistent memory component) associated with the memory device. By monitoring such characteristics, determinations can be made as to whether data associated with a memory access request should be written to non-persistent memory (e.g., to facilitate quick retrieval of such data) or to persistent memory (e.g., to reduce the amount of data written to the non-persistent memory), which can allow for usage of persistent and non-persistent memory to be optimized for a computing system.

As described herein, some embodiments of the present disclosure are directed to computing systems in which data from a non-volatile, and hence, non-deterministic, memory resource is passed via an interface that is restricted to use by a volatile and deterministic memory resource in other approaches. For example, in some embodiments, data may be transferred to and from a non-volatile, non-deterministic memory resource, such as a NAND flash device, a resistance variable memory device, such as a phase change memory device and/or a resistive memory device (e.g., a three-dimensional Crosspoint (3D XP) memory device), a solid-state drive (SSD), a self-selecting memory (SSM) device, etc. via an interface such as a DDR interface that is reserved for data transfer to and from a volatile, deterministic memory resource in some approaches. That is, in some embodiments, control circuitry can be operated to cause data written to non-volatile memory resources to be passed via a DDR interface as opposed to a PCIe interface. Similarly, in some embodiments, control circuitry can be operated to cause data written to volatile memory resources to be passed via a PCIe interface as opposed to a DDR interface. Accordingly, in contrast to approaches in which volatile, deterministic memory devices are used to provide main memory to a computing system, embodiments herein can allow for non-volatile, non-deterministic memory devices to be used as at least a portion of the main memory for a computing system.

In some embodiments, the data (e.g., data that is redirected from a non-persistent memory device to a persistent memory device in accordance with aspects of the disclosure) may be intermediately transferred from non-volatile memory resources to a cache (e.g., a small static random-access memory (SRAM) cache) or buffer and subsequently made available to the application that requested the data. By storing data that is normally provided in a deterministic fashion in a non-deterministic memory resource and allowing access to that data as described here, computing system performance may be improved by, for example, allowing for a larger amount of memory resources to be made available to a multi-user network and hence users of virtual machines connected to the multi-user network at a substantially reduced cost in comparison to approaches that generally operate using all or mostly all volatile memory resources.

In order to facilitate embodiments of the present disclosure, visibility to the non-volatile memory resources may be obfuscated to various devices of the computing system in which a memory device (e.g. a memory device that include both persistent memory components and non-persistent memory components) is deployed. For example, host(s), input/output (I/O) devices, such as a network interface card (NIC), which may be referred to herein in the alternative as a network interface controller, virtual machine(s), etc. that are deployed in the computing system or multi-user network may be unable to distinguish between whether data is stored by a volatile memory resource or a non-volatile memory resource of the computing system. For example, hardware circuitry may be deployed in the computing system that can register addresses that correspond to the data in such a manner that the host(s), I/O device(s), NIC(s), virtual machine(s), etc. are unable to distinguish whether the data is stored by volatile or non-volatile memory resources.

This can allow for the capacity of a memory device (e.g., the amount of overall storage availability) to appear to external computing devices (e.g., host computing systems, virtual machines, etc.) as being generally persistent while allowing for the capacity of the memory device to appear to circuitry internal to the memory device (e.g., I/O devices) as generally being non-persistent. This can improve the performance of a computing system in which embodiments descried herein operate by obfuscating the difference between persistent and non-persistent memory resources presented as being available to various devices in the computing system, thereby allowing for memory access control to be facilitated by control circuitry resident on a memory device.

As described in more detail herein, a memory system may include hardware circuitry (e.g., control circuitry) that can receive memory access requests, determine characteristics of data associated with the memory access requests, and redirect memory access requests to non-persistent or persistent memory based on the characteristics of data associated with the memory access requests. In some embodiments, the hardware circuitry can perform such operations without notifying external circuitry, such as an I/O device or host coupled to the hardware circuitry that the data has been redirected to the persistent or non-persistent memory. Further, some embodiments can allow for the control circuitry to register an address associated with the requested data (despite the hardware circuitry not being backed up by its own memory resource to store the data) in a data structure that is provisioned with memory resources that are resident on the control circuitry, and map, using the control circuitry, the address registered in the data structure to a physical address corresponding to the data in a non-volatile memory device and/or a volatile memory device.

In the following detailed description of the present disclosure, reference is made to the accompanying drawings that form a part hereof, and in which is shown by way of illustration how one or more embodiments of the disclosure may be practiced. These embodiments are described in sufficient detail to enable those of ordinary skill in the art to practice the embodiments of this disclosure, and it is to be understood that other embodiments may be utilized and that process, electrical, and structural changes may be made without departing from the scope of the present disclosure.

As used herein, designators such as "N," "M," "X," etc., particularly with respect to reference numerals in the drawings, indicate that a number of the particular feature so designated can be included. It is also to be understood that the terminology used herein is for the purpose of describing particular embodiments only, and is not intended to be limiting. As used herein, the singular forms "a," "an," and "the" can include both singular and plural referents, unless the context clearly dictates otherwise. In addition, "a number of," "at least one," and "one or more" can refer to one or more of such things (e.g., a number of memory banks can refer to one or more memory banks), whereas a "plurality of" is intended to refer to more than one of such things.

Furthermore, the words "can" and "may" are used throughout this application in a permissive sense (e.g., having the potential to, being able to), not in a mandatory sense (e.g., must). The term "include," and derivations thereof, means "including, but not limited to." The terms "coupled" and "coupling" mean to be directly or indirectly connected physically or for access to and movement (transmission) of commands and/or data, as appropriate to the context. The terms "data" and "data values" are used interchangeably herein and can have the same meaning, as appropriate to the context.

The figures herein follow a numbering convention in which the first digit or digits correspond to the figure number and the remaining digits identify an element or component in the figure. Similar elements or components between different figures may be identified by the use of similar digits. For example, 104 may reference element "04" in FIG. 1, and a similar element may be referenced as 204 in FIG. 2. A group or plurality of similar elements or components may generally be referred to herein with a single element number. For example, a plurality of reference elements 106-1, 106-2, ..., 106-N (e.g., 106-1 to 106-N) may be referred to generally as 106. As will be appreciated, elements shown in the various embodiments herein can be added, exchanged, and/or eliminated so as to provide a number of additional embodiments of the present disclosure. In addition, the proportion and/or the relative scale of the elements provided in the figures are intended to illustrate certain embodiments of the present disclosure and should not be taken in a limiting sense.

Figure 1:
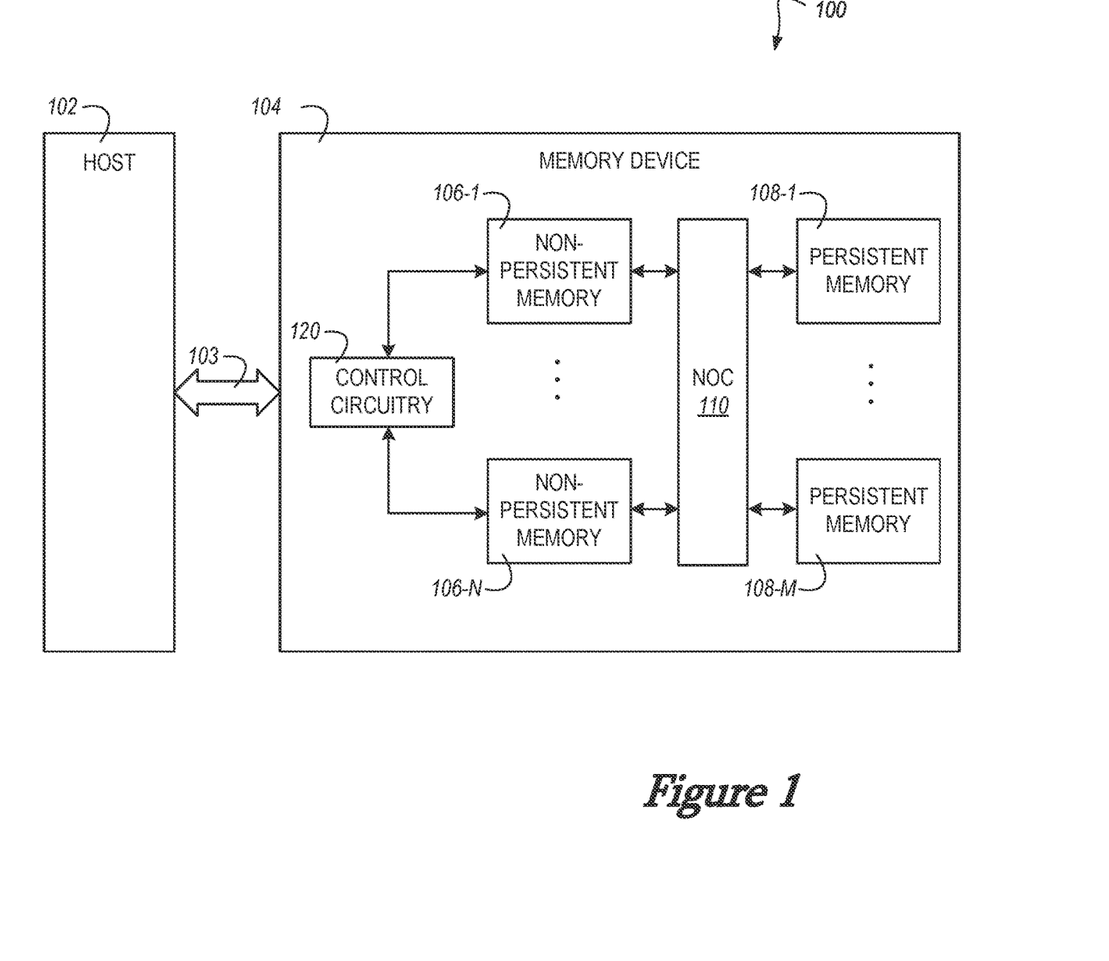
FIG. 1 is a functional block diagram in the form of a computing system including a host and a memory device in accordance with a number of embodiments of the present disclosure.

FIG. 1 is a functional block diagram in the form of a computing system 100 including a host 102 and a memory device 104 in accordance with a number of embodiments of the present disclosure. The computing system 100 can be part of an apparatus. As used herein, an "apparatus" can refer to, but is not limited to, any of a variety of structures or combinations of structures, such as a circuit or circuitry, a die or dice, a module or modules, a device or devices, or a system or systems, for example. The memory device 104 can include a one or more memory modules (e.g., single in-line memory modules, dual in-line memory modules, etc.). The memory device 104 can include volatile memory and/or non-volatile memory, such as the non-persistent memory (e.g., the volatile memory) 106-1 to 106-N and the persistent memory (e.g., the non-volatile memory) 108-1 to 108-M. In a number of embodiments, memory device 104 can include a multi-chip device. A multi-chip device can include a number of different memory types and/or memory modules. For example, a memory system can include non-volatile or volatile memory on any type of a module. In addition, each of the components (e.g., the host 102, the memory device 104, the non-persistent memory 106-1 to 106-N, the persistent memory 108-1 to 108-M, the network-on-chip (NOC) 110, and/or the control circuitry 120) can be separately referred to herein as an "apparatus."

The memory device 104 can provide main memory for the computing system 100 or could be used as additional memory or storage throughout the computing system 100. As shown in FIG. 1, the memory device 104 can include one or more non-persistent memory components 106-1 to 106-N (referred to herein in the alternative as "volatile" memory components) and one or more persistent memory components 108-1 to 108-M (referred to herein in the alternative as "non-volatile" memory components). The non-persistent memory components 106-1 to 106-N can include volatile memory devices, such as dynamic random access memory (DRAM) devices or the like, while the persistent memory components 108-1 to 108-M can include non-volatile memory devices that are provided with a NAND architecture, for example. Embodiments are not limited to a particular type of memory device, however. For example, the non-persistent memory components 106-1 to 106-N can include other volatile memory device such as static random access memory (SRAM) devices, while the persistent memory components 108-1 to 108-M can include other non-volatile memory devices such as NOR architecture devices, non-volatile random-access memory devices (e.g., NVRAM, ReRAM, FeRAM, MRAM, PCM), "emerging" memory devices such as resistance variable (e.g., 3-D Crosspoint (3D XP)) memory devices, memory devices that include an array of self-selecting memory (SSM) cells, memory devices that operate according to a compute express link (CXL) protocol, etc., or any combination thereof.

Resistance variable memory devices can perform bit storage based on a change of bulk resistance, in conjunction with a stackable cross-gridded data access array. Additionally, in contrast to many flash-based memories, resistance variable non-volatile memory can perform a write in-place operation, where a non-volatile memory cell can be programmed without the non-volatile memory cell being previously erased. In contrast to flash-based memories and resistance variable memories, self-selecting memory cells can include memory cells that have a single chalcogenide material that serves as both the switch and storage element for the memory cell.

In some embodiments, the memory device 104 can be a Compute Express Link (CXL) compliant memory system (e.g., the memory device can include a PCIe/CXL interface). CXL is a high-speed central processing unit (CPU)-to-device and CPU-to-memory interconnect designed to accelerate next-generation data center performance. CXL technology maintains memory coherency between the CPU memory space and memory on attached devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the peripheral component interconnect express (PCIe) infrastructure, leveraging PCIe physical and electrical interfaces to provide advanced protocol in areas such as input/output (I/O) protocol, memory protocol (e.g., initially allowing a host to share memory with an accelerator), and coherency interface. In some embodiments, the CXL technology can include a plurality of I/O lanes configured to transfer a plurality of commands to or from circuitry external to the control circuitry 120, such as the non-persistent memory components 106-1 to 106-N, the persistent memory components 108-1 to 108-M and/or the host 102 at a rate of around thirty-two (32) giga-transfers per second. In another embodiments, the CXL technology can comprise a peripheral component interconnect express (PCIe) 5.0 interface coupled to a plurality of I/O lanes, and the controller 120 is to receive commands involving at least one of the non-persistent memory components 106 or the persistent memory components 108, or both, via the PCIe 5.0 interface according to a compute express link memory system.

As shown in FIG. 1, the host 102 is coupled to the memory device 104 via a communication path 103. The communication path 103 can be a wired or wireless communication path that can be utilized to transfer data, commands, and other information between the host 102 and the memory device 104. The host 102 can be a host system such as a personal laptop computer, a desktop computer, a digital camera, a smart phone, a memory card reader, and/or an internet-of-things (IoT) enabled device, among various other types of hosts. In some embodiments, however, the host 102 includes one or more central processing units that execute instructions to control operation of a virtual machine (e.g., the virtual machines 332 illustrated in FIG. 3, herein).

One of ordinary skill in the art will appreciate that "a processor" can intend one or more processors, such as a parallel processing system, a number of coprocessors, etc. The computing system 100 can include separate integrated circuits or one or more of the host 102, the memory device 104, the control circuitry 120, the non-persistent memory components 106-1 to 1-6-N, and/or the persistent memory components 108-1 to 108-M can be on the same integrated circuit. The computing system 100 can be, for instance, a server system and/or a high-performance computing (HPC) system and/or a portion thereof. Although the example shown in FIG. 1 illustrate a system having a Von Neumann architecture, embodiments of the present disclosure can be implemented in non-Von Neumann architectures, which may not include one or more components (e.g., CPU, ALU, etc.) often associated with a Von Neumann architecture.

Figure 2:
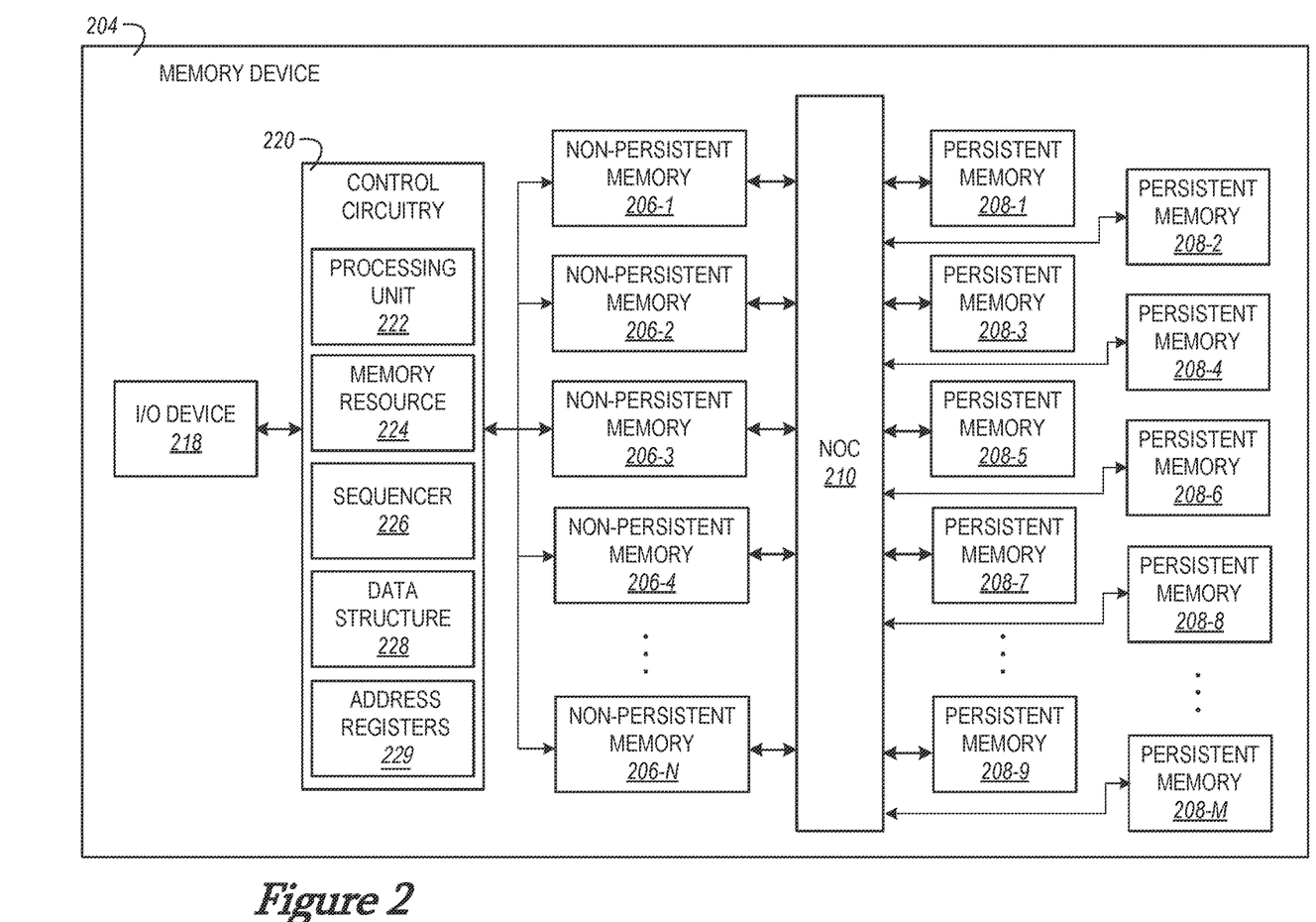
FIG. 2 is a functional block diagram of a memory device in accordance with a number of embodiments of the present disclosure.

The memory device 104 can include control circuitry 120, which can include a processing unit (e.g., the processing unit 222 illustrated in FIG. 2, herein). The processing unit can be provided in the form of an integrated circuit, such as an application-specific integrated circuit (ASIC), field programmable gate array (FPGA), reduced instruction set computing device (RISC), advanced RISC machine, system-on-a-chip, or other combination of hardware and/or circuitry that is configured to perform operations described in more detail, herein. In some embodiments, the processing unit can comprise one or more processors (e.g., processing device(s), co-processors, etc.).

The control circuitry 120 can be resident on the memory device 104. As used herein, the term "resident on" refers to something that is physically located on a particular component. For example, the control circuitry 120 being resident on the memory device 104 refers to a condition in which the control circuitry 120 is physically coupled to, or physically within the memory device. The term "resident on" may be used interchangeably with other terms such as "deployed on" or "located on," herein.

The control circuitry 120 can perform operations to monitor and/or determine characteristics of workloads running on the memory device 104. The characteristics can include information such as bandwidth consumption, memory resource consumption, access frequency (e.g., whether the data associated with one or more of the workloads is hot or cold), and/or power consumption in execution of the workloads, among others. The control circuitry 120 can control writing of at least a portion of data associated with a memory access request received by the control circuitry 120 via an input/output (I/O) device (e.g., the I/O device 218 illustrated in FIG. 2, herein) in order to optimize writing of data associated with the memory access request to the non-persistent memory component 106-1 to 106-N and/or the persistent memory components 108-1 to 108-M based on the determined characteristics of the memory access request and/or the workloads executed by the memory device 104. As described herein, the I/O device can be a network interface card (NIC) that can be a standard NIC or a virtualized NIC.

FIG. 2 is a functional block diagram of a memory device 204 in accordance with a number of embodiments of the present disclosure. The memory device 204 can be part of a computing system, and/or can be provided as an FPGA, an ASIC, a number of discrete circuit components, etc., in a manner analogous to the memory device 104 previously described in connection with FIG. 1.

The memory device 204 can include an input/output (I/O) device 218, which can be coupled to control circuitry 220. The control circuitry 220 can be analogous to the control circuitry 120 illustrated in FIG. 1, herein. As shown in FIG. 2, the control circuitry 220 includes a processing unit 222, a memory resource 224, a sequencer 226, and a data structure 228. In some embodiments, the data structure 228 can be stored in the memory resource 224.

The I/O device 218 can be a network interface controller or network interface card, both of which can be referred to herein as a "NIC." The I/O device 218 can provide a computing system (e.g., the computing system 100 illustrated in FIG. 1) with a dedicated, full-time connection to a network by implementing the physical layer circuitry necessary for communicating with the computing system via an IEEE 802 data link layer standard, such as Ethernet or Wi-Fi. In some embodiments, the I/O device 218 can allow for communication between the computing system and a virtual machine, such as the virtual machine(s) 332-1, 332-2, 332-3 to 332-X illustrated in FIG. 3, herein.

In some embodiments, the I/O device 218 can be a device that is configured to provide direct memory access via a physical address and/or a virtual machine physical address. In some embodiments, the I/O device 218 can be a NIC, a storage device, a graphics rendering device, or other I/O device. The I/O device 218 can be a physical I/O device or the I/O device 218 can be a virtualized I/O device 218. For example, in some embodiments, the I/O device 218 can be a physical card that is physically coupled to a computing system via a bus or interface such as a PCIe interface or other suitable interface. In embodiments in which the I/O device 218 is a virtualized I/O device 218, the virtualized I/O device 218 can provide I/O functionality in a distributed manner. In some embodiments, the I/O device 218 can operate as an input/output coupled to the control circuitry 220. The control circuitry 220, via the I/O device 218, can transmit a command indicative of a data access involving the non-persistent memory devices 206-1 to 206-N and/or the persistent memory devices 208-1 to 208-M.

The I/O device 218 can receive memory access requests (e.g., requests to write and/or read data from the non-persistent memory devices 206-1 to 206-N and/or the persistent memory devices 208-1 to 208-M). However, in at least one embodiment, the I/O device 218 receives memory access requests to read data from or write data to one of the non-persistent memory devices 206-1 to 206-N. In such embodiments, the control circuitry 220 can receive the memory access request from the I/O device 218 and, instead of reading data from or writing data to one of the non-persistent memory device 206-1 to 206-N, can redirect the memory access request to one of the persistent memory devices 208-1 to 208-M. Advantageously, in such embodiments, the control circuitry 220 can redirect the memory access request to one of the persistent memory devices 208-1 to 208-M without notifying the I/O device 218 such that I/O device 218 is unaware that the memory access request has been executed involving one of the persistent memory devices 208-1 to 208-M as opposed to one of the non-persistent memory devices 206-1 to 206-N, as described in more detail, herein.

As generally used herein, the term "execute," as well as variants thereof, generally refers to performance of operations to performed by hardware circuitry (e.g., the control circuitry 220) to access data that is stored at a targeted address in a memory device or memory component and/or to write data to a targeted address in a memory device or memory component. For example, the phrase "executing a memory access request" is generally to be interpreted as describing (by hardware circuitry) performance of an operation that writes or reads data from a specified or targeted address in a volatile (e.g., non-persistent) or non-volatile (e.g., persistent) memory device. Performance of such operations (e.g., execution of memory access requests") can be realized entirely in hardware circuitry and/or by hardware circuitry that runs computing instructions to facilitate performance of operations to access targeted address locations in memory device. As appropriate given the context and disclosure of some embodiments described herein, the term "execute" and variants thereof may therefor be used interchangeably with access of data associated with a targeted address in a memory device and/or memory component.

In some embodiments, the I/O device 218 can generate and append data ("I/O data" or "NIC data") to the memory access request. The I/O data can include data corresponding to operations performed by the I/O device 218 to determine whether data associated with the memory access request is "of interest." As used herein, the data associated with the memory access request being "of interest" generally refers to a condition in which the data is different than previous data associated with a memory access request or is useful to particular applications being executed using the memory device 204. As a non-limiting example, some applications, such as monitoring of nuclear colliders, can repeatedly receive data that is the same as previous data. Accordingly, the I/O device 218 can determine that the data that is the same as previous data is not "of interest" and can append I/O device data indicating that the data that is not "of interest" is not to be stored by the memory device 204 or is written to the persistent memory device(s) 208 by the control circuitry 220. In contrast, if the data associated with the memory access request is different than the previously received data, the I/O device 218 can append I/O device data indicating that the data is "of interest" and therefore can be written to the persistent memory device(s) 208 and/or to the non-persistent memory device(s) 206, as determined by the control circuitry 220.

In another non-limiting example, data collected by an autonomous vehicle may include data that is both of interest and not of interest during its course of operation. For example, the autonomous vehicle may receive hundreds of data points per second, however only a few of those data points may involve objects that are close enough to the vehicle to qualify as being of interest. In these scenarios, the I/O data can include data that is appended to the memory access request to indicate that the data is of interest (e.g., the few data points that involve objects near to the vehicle) and should therefore be written to the non-persistent memory devices 206 (provided the control circuitry 220 obliges) or the I/O data can include data that is appended to the memory access request to indicate that the data is not of interest (e.g., the majority of data points that involve objects not near to the vehicle) and could therefore be written to the persistent memory devices 208 (provided the control circuitry 220 obliges).

As mentioned above, the processing unit 222 can be provided in the form of an integrated circuit, such as an application-specific integrated circuit (ASIC), field programmable gate array (FPGA), reduced instruction set computing device (RISC), advanced RISC machine, system-ona-chip, or other combination of hardware and/or circuitry that is configured to perform operations described in more detail, herein. In some embodiments, the processing unit can comprise one or more processors (e.g., processing device(s), co-processors, etc.).

In some embodiments, the processing unit can perform various operations described herein. For example, the processing unit 222 can perform operations to monitor characteristics of the memory access requests and/or characteristics of data associated with the memory access requests. As describe above, the characteristics of the memory requests and/or the data associated with the memory access requests can include a frequency of different types of memory access requests (e.g., a frequency of memory access requests that involve contiguous data vs. non-contiguous data, memory access requests that involve particular types of applications and/or workloads, memory access requests that involve particular types of data that may be stored by the memory device 204 for different periods of times, etc.). The processing unit 222 can selectively execute the memory access requests using the non-persistent memory 206-1 to 206-N and/or the persistent memory 208-1 to 208-M based on the monitored characteristics of the memory access requests and/or the data associated therewith.

For example, the I/O device 218 can receive a memory access request from circuitry external to the memory device 204 and transfer the memory access request (or append I/O data to the memory access request and transfer the memory access request including the I/O device data) to the control circuitry 220. In some embodiments, the I/O device 218 can request that the memory access request is executed using the non-persistent memory 206-1 to 206-N, as described herein. The control circuitry 220 (e.g., the processing unit 222) can monitor and/or determine characteristics of the memory access request and/or data associated with the memory access request and determine whether to execute the memory access request using the non-persistent memory 206-1 to 206-N or execute the memory access request using the persistent memory 208-1 to 208-M. In embodiments in which the control circuitry 220 executes the memory access request using the persistent memory 208-1 to 208-M, the control circuitry 220 can refrain from transferring information to the I/O device 218 indicating that the memory access request was executed using the persistent memory 208-1 to 208-M, as opposed to using the non-persistent memory 206-1 to 206-N, as requested by the I/O device 218.

The control circuitry 220 further includes a memory resource 224. The memory resource 224 can include one or more caches and/or buffers. In some embodiments, the memory resource 224 can include SRAM and/or DRAM, although embodiments are not limited to these enumerated examples. In some embodiments, the data structure 228 can be included within the memory resource 224. Data associated with memory access requests can be stored (e.g., buffered in the memory resource) as part of performance of a read operation or a write operation indicated by the memory access request.

As shown in FIG. 2, the control circuitry 220 further includes a sequencer 226. The sequencer 226 can include hardware circuitry and/or can include instructions executable by the hardware circuitry to generate addresses associated with the non-persistent memory 206-1 to 206-N and/or the persistent memory 208-1 to 208-M. Such address can be indicative of physical locations in the non-persistent memory 206-1 to 206-N and/or the persistent memory 208-1 to 208-M in which data is written. In addition to, or in the alternative, the sequencer 226 can include hardware circuitry and/or can include instructions executable by the hardware circuitry to determine an order in which incoming memory access requests are processed by the control circuitry 220.

Further, as shown in FIG. 2, the control circuitry 220 includes a data structure 228. As used herein, a "data structure" refers to a specialized format for organizing and/or storing data, which may or may not be organized in rows and columns. Examples of data structures include arrays, files, records, tables, trees, linked lists, hash tables, etc. In some embodiments, the data structure 228 can be configured to store address mapping information for redirected memory access requests (e.g., physical addresses in the persistent memory 208-1 to 208-M in which the control circuitry 220 has executed a memory access request received by the I/O device 218). This can allow for the control circuitry 220 to retrieve data associated with a memory access request received from the I/O device to, for example, retrieve data that has been redirected to the persistent memory 208-1 to 208-M by the control circuitry 220 as described herein.

As shown in FIG. 2, the control circuitry 220 includes address registers 229. The address registers 229 can comprise base address registers ("BARs") (e.g., BAR_1, BAR_2, BAR_3, BAR_4, BAR_5, BAR_6, etc.). The base address registers can be PCI BAR fields that are configured to store up to 32-bits of addressing information. In general, an amount of memory allocated for use in performance of various applications can be dictated by the contents of the address registers 229. In some embodiments, the control circuitry 220 can redirect memory access requests as part of an operation to determine an address in the address registers 229 that is to be accessed in response to assertion of an interrupt signal (e.g., an interrupt asserted to a hypervisor 330 coupled to the memory device 104, an interrupt signal asserted to the I/O device 218 as part of retrieving data associated with a memory access request, etc.).

In some embodiments, at least one of the address registers 229 can include a quantity of address spaces that correspond to a size of a memory component (e.g., the persistent memory device(s) 208 and/or the non-persistent memory device(s) 206. For example, if the memory component contains one terabyte of storage, at least one of the address registers 229 can be configured to have an address space that can include one terabyte of address space. However, in some embodiments, the address register 209 does not actually include one terabyte of storage and instead is configured to appear to have one terabyte of storage space.

A different address register of the address registers 229 can be used to store addresses that correspond to interrupt control, as described in more detail herein. In some embodiments, this address register can map direct memory access (DMA) read and DMA write control and/or status registers. For example, this address register can include addresses that correspond to descriptors and/or control bits for DMA command chaining, which can include the generation of one or more interrupt messages that can be asserted to the I/O device 218 and/or to a hypervisor 330 as part of operation involving the virtual machines 332 described in connection with FIG. 3, herein.

Figure 3:
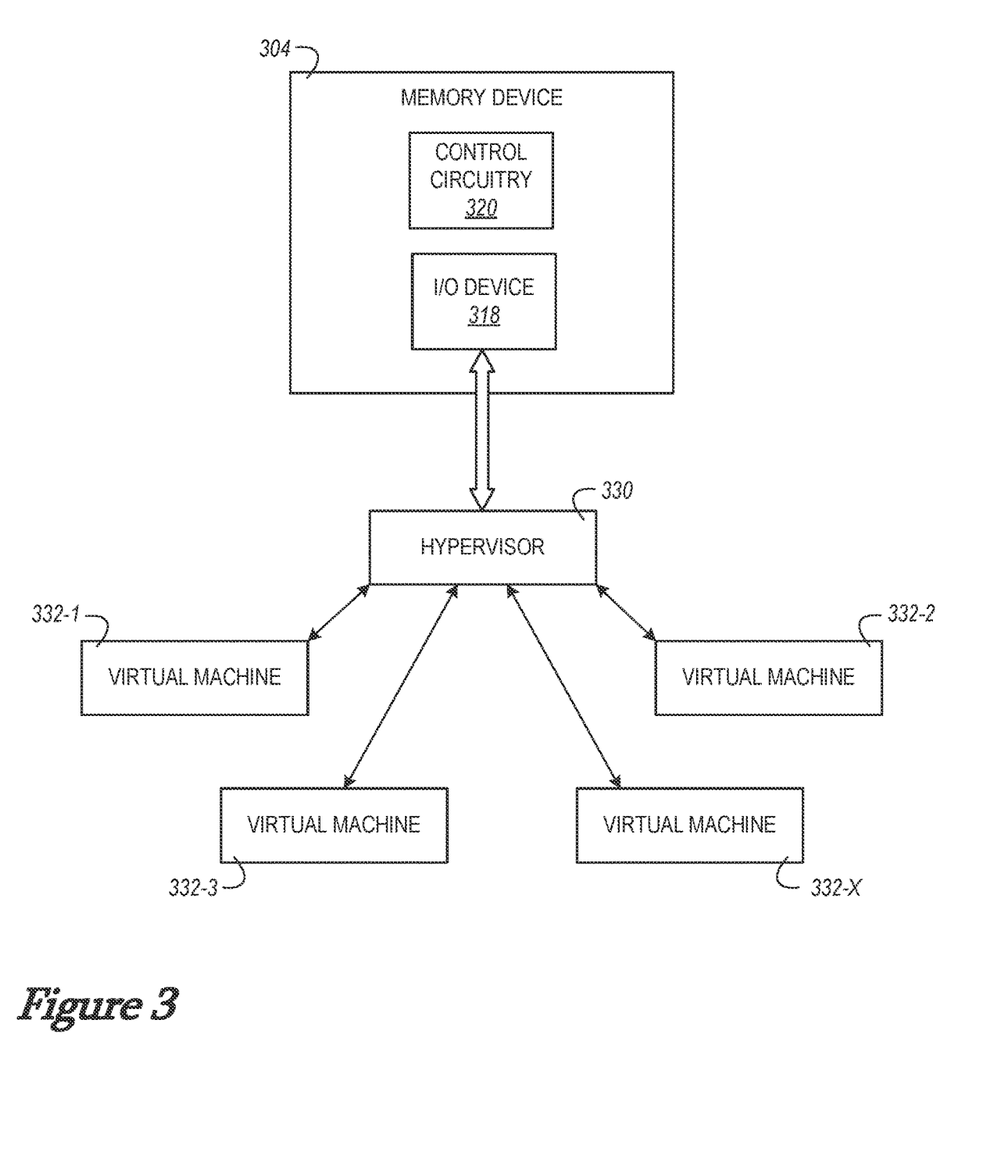
FIG. 3 is a functional block diagram of a memory device coupled to multiple virtual machines in accordance with a number of embodiments of the present disclosure.

Yet another one of the address registers 229 can store addresses that correspond to access to and from a hypervisor 330 on which the virtual machines 332 of FIG. 3 are running. In some embodiments, access to and/or from the hypervisor 330 can be provided via an Advanced eXtensible Interface (AXI) DMA associated with the memory device 204. In some embodiments, this address register can map addresses corresponding to data transferred via a DMA (e.g., an AXI DMA) of the memory device 204 to a location external to the memory device 204.

In some embodiments, at least one address register 229 can store addresses that correspond to the I/O device 218 to access the control circuitry 220. This address register may store addresses that are bypassed by DMA components associated with the memory device 204. This address register can be provided such that addresses mapped thereto are not "backed up" by a physical memory location of the control circuitry 220. That is, in some embodiments, the memory device 204 can be configured with an address space that stores addresses that correspond to data stored in a persistent memory device (e.g., the persistent memory device 208) and not to data stored by the non-persistent memory device 206. For example, this address register can be configured as a virtual address space that can store logical addresses that correspond to physical memory locations in a memory component in which data is stored.

The memory device 204 further include non-persistent memory 206-1 to 206-N and persistent memory 208-1 to 208-M. As described above, the non-persistent memory 206-1 to 206-N can include volatile memory resources while the persistent memory 208-1 to 208-M can include non-volatile memory resources. The non-persistent memory 206-1 to 206-N can be referred to as "non-persistent memory components" or "non-persistent memory devices" and the persistent memory 208-1 to 208-M can be referred to as "persistent memory components" or "persistent memory devices."

As shown in the FIG. 2, the non-persistent memory 206-1 to 206-N can be communicatively coupled to the persistent memory 208-1 to 208-M via a network-on-a-chip (NOC) 210. The NOC 210 can be a communication subsystem that is configured to facilitate transfer of memory access requests and/or data corresponding thereto between the control circuitry 220, the non-persistent memory 206-1 to 206-N and/or the persistent memory 208-1 to 208-M. The NOC 210 can be coupled to the non-persistent memory devices 206-1 to 206-N and/or to the persistent memory devices 208-1 to 208-M via communication paths that can operate according to a DDR protocol, a PCIe protocol, and/or a CXL protocol although embodiments are not so limited. In at least one embodiment, however, the NOC 210 can transfer data from the persistent memory devices 208-1 to 208-M to the non-persistent memory devices 206-1 to 206-N, or vice versa, according to a DDR protocol or a CXL protocol.

Although not explicitly shown in FIG. 2 so as to not obfuscate the drawings, the memory device 204 can include various buffers (e.g., a read buffer and/or a write buffer) to buffer data and/or memory access requests received from the I/O device 218. The buffers can be around 4 KB in size, although embodiments are not limited to this particular size. In come embodiments, the memory device 204 can include a multiplexer (MUX) that can include circuitry that can comprise one or more logic gates and can be configured to control data and/or address bussing for the memory device 204. For example, the MUX can transfer messages to and from the memory resource 224, as well as communicate with other components of the memory device 204. The MUX can redirect incoming messages, commands, and/or requests (e.g., read and/or write requests), received by the control circuitry 220 (e.g., from a host, I/O device 218, a hypervisor 330, and/or a virtual machine 332) as part of an operation to determine whether to execute the memory access request using the non-persistent memory 206-1 to 206-N or the persistent memory 208-1 to 208-M.

In a non-limiting example, an apparatus (e.g., the memory device 204) includes a non-persistent memory component 206 and a persistent memory component 208 coupled to the non-persistent memory component 206. As mentioned above, the non-persistent memory component 206 can be referred to as a "volatile memory component" and the persistent memory component 208 can be referred to as a "non-volatile memory component." The apparatus can further include a network interface card (NIC), such as the input/output (I/O) device 218. The apparatus can further include control circuitry 220 coupled to NIC, the non-persistent memory 206 component, and the persistent memory component 208.

The control circuitry 220 can receive multiple memory access requests from the NIC and analyze the memory access requests to determine characteristics associated with data corresponding to memory access requests. The control circuitry 220 can access data associated with a particular memory access request that targets an address in the non-persistent memory component 206 in response to a determination that the characteristics associated with the data are below a threshold data characteristic value and/or access data associated with a particular memory access request at a targeted address using the persistent memory component 208 in response to a determination that the characteristics associated with the data are above the threshold data characteristic value. As used herein, a "threshold data characteristic value" generally refers to a value at which the characteristics of the data and/or the memory access request can be redirected by the control circuitry 220 from the non-persistent memory component 206 to the persistent memory component 208. For example, if a predicted amount of time that the data will be stored by the memory device 204 and/or a frequency of a particular memory access request is greater than the threshold data characteristic value, the control circuitry 220 can redirect the data and/or the memory access request from the non-persistent memory component 206 to the persistent memory component 208. If, however, the predicted amount of time that the data will be stored by the memory device 204 and/or the frequency of a particular memory access request is less than the threshold data characteristic value, the control circuitry 220 can execute the memory access request using the non-persistent memory component 206.

As described in more detail in connection with FIG. 3, herein, the NIC can receive the memory access requests from a virtual machine (e.g., one or more of the virtual machines 332 illustrated in FIG. 3, herein) prior to transferring the memory access requests to the control circuitry 220. Embodiments are not so limited, however, and in some embodiments, the NIC can receive the memory access requests from a physical server or other host computing system that can be coupled to the memory device 204.

In some embodiments, the control circuitry 220 can execute the particular memory access request (e.g., can access data at a targeted address) using the persistent memory component 208 while refraining from transferring signaling indicating that the particular memory access request is executed (e.g., the request is executed to access data at a targeted address location) using the persistent memory component 208. For example, the control circuitry 220 can access data in a targeted address of the by executing the memory access request using the persistent memory component 208 independently of signaling transferred to or from the NIC indicating to the NIC that the memory access request is being executed using the persistent memory component 208 as opposed to the non-persistent memory component 206 as directed by the NIC.

Continuing with this example, the control circuitry 220 can include a data structure 228 configured to store address information corresponding to the plurality of memory access requests received from the NIC. In such embodiments, the control circuitry 220 can write the address information to the data structure responsive to receipt of the memory access requests from the NIC.

As mentioned above, the control circuitry 220 can further include a sequencer 226. In such embodiments, the sequencer 226 can manage memory access requests and command sequencing for the NIC, the non-persistent memory component 206, and the persistent memory component 208. In generally, the sequencer 226 can order operations performed by the I/O device 218 and/or the control circuitry 220 to guarantee that constraints associated with the order of execution of memory access requests or other commands (e.g., performance of read/write switches) are maintained. In some embodiments, the sequencer 226 can re-order execution of memory access requests and other command to maximize or optimize throughput of the memory device 204.

In some embodiments, the control circuitry 220 can determine, based on the determined characteristics associated with the data corresponding to the memory access requests, a predicted amount of time that the data will be stored by the non-persistent memory component 206 and/or the persistent memory components 208. Continuing with this example, the control circuitry 220 can determine the threshold data characteristic value based on the determined predicted amount of time that the data will be stored by the non-persistent memory component 206 or the persistent memory components 208.

As described herein, the control circuitry 220 can receive signaling indicative of a read operation involving data associated with the particular memory access request that was executed using the persistent memory component 208 and inform the NIC that execution of the read operation will take an amount of time greater than an amount of time associated with performance of a deterministic read operation (e.g., that there will be a delay in retrieving the data that the NIC is not expecting). For example, because the NIC may be unaware that the control circuitry 220 has written data corresponding to a previous write operation to the persistent memory component 208, the control circuitry 220 can inform (e.g., via application of an interrupt signal or other signaling or commands) the NIC, as part of a read operation, that retrieval of the data can operate in a non-deterministic manner.

For example, in some embodiments, the memory device 204 (e.g., the control circuitry 220 of the memory device 204) can generate and assert an interrupt to the I/O device 218 to initiate an operation to transfer data into or out of the persistent memory device(s) 208. For example, due to the non-deterministic nature of data retrieval and storage associated with the persistent memory device(s) 208, the control circuitry 220 can generate an interrupt signal when a transfer of the data that is stored in the persistent memory device(s) 208 is requested. In response to this (page fault) interrupt signal generated by the control circuitry 220, the control circuitry 220 can retrieve information corresponding to the data from the persistent memory device(s) 208. For example, the memory device 204 can retrieve data that can include logical to physical address mappings corresponding to the data that are stored in the address registers 229 of the control circuitry 220.

Once the data has been stored in the persistent memory device 208, a portion of the non-persistent memory device 206 (e.g., a page, a block, etc.) can be marked as inaccessible by the control circuitry 220 so that a computing system in which the memory device 204 is deployed does not attempt to access the data from the non-persistent memory device 206. This can allow a data request to be intercepted with a page fault, which can be generated by the control circuitry when the data that has been stored in the persistent memory device 208 is requested by the I/O device 218.

In contrast to approaches in which a page fault exception is raised in response to an application requesting access to a page of memory that is not mapped by a memory management unit, in embodiments of the present disclosure, the interrupt signal or "page fault" described above can be generated by the control circuitry 220 in response to the data being mapped in the address registers 229, which, in turn maps the data to the persistent memory device 208.

In some embodiments, the control circuitry 220 can transfer the data associated with the particular memory access request that was executed using the persistent memory component 208 to the non-persistent memory component 206 subsequent to informing the NIC that execution of the read operation will take the amount of time greater than the amount of time associated with performance of the deterministic read operation. The control circuitry 220 can then transfer the data associated with the particular memory access request from the non-persistent memory component 206 to the NIC.

In another non-limiting example, an apparatus (e.g., the memory device 204) includes a non-persistent memory component 206 and a persistent memory component 208 coupled to the non-persistent memory component 206. The persistent memory component 208 can be coupled to the non-persistent memory component 206 via a network-on-a-chip, such as the NOC 210. The apparatus can further include an input/output (I/O) device 218. The apparatus can further include control circuitry 220 coupled to the I/O device 218, the non-persistent memory 206 component, and the persistent memory component 208.

Continuing with this example, the I/O device 218 can receive a command to access data (e.g., a memory access request) that was previously targeted to be written to the non-persistent memory component 206 and transfer the command to access the data to the control circuitry 220. For example, the command to access data can specify that the data to be accessed is written to or read from the non-persistent memory component 206. Stated alternatively, in some embodiments, prior to receipt of the command to access the data, the control circuitry 220 can divert the data that was previously targeted to be written to the non-persistent memory component 206 to the persistent memory component 208 based on characteristics of the data that are described herein. For example, the characteristics of the data include a predicted amount of time between memory access requests that involve data that is similar to the data indicated by the command, among other characteristics described herein. Further, as described herein, the control circuitry 220 can divert the data to the persistent memory component 206 without notifying the I/O device 218 that the data has been diverted to the persistent memory component 206.

Upon receipt of the command to access the data, the control circuitry 220 can determine that the data has been written to the persistent memory component 208 based on characteristics of the data and inform the I/O device 218 that execution of the command to access the data will take an amount of time greater than an amount of time associated with performance of a deterministic read operation. The control circuitry 206 can then transfer the data from the persistent memory component 208 to the non-persistent memory component 206 subsequent to informing the I/O device 218 that execution of the command to access the data will take the amount of time greater than the amount of time associated with performance of the deterministic read operation. In such examples, the control circuitry 220 can transfer the data from the non-persistent memory component 206 to the I/O device 218.

As described herein, in some embodiments, the control circuitry 220, I/O device 218, the non-persistent memory component 206, and the persistent memory component 208 comprise a pool of computing resources accessible by a virtual machine, such as the virtual machines 332 illustrated in FIG. 3, herein. For example, the memory device 204 can provided in a cloud computing environment to provide hardware resources accessible to one or more virtual machines.

FIG. 3 is a functional block diagram of a memory device 304 coupled to multiple virtual machines 322 in accordance with a number of embodiments of the present disclosure. The memory device 304 can be analogous to the memory device 104 illustrated in FIG. 1 and/or the memory device 204 illustrated in FIG. 2, herein. As shown in FIG. 3, the memory device 304 includes an I/O device 318, which can be analogous to the I/O device 218 illustrated in FIG. 2, herein.

The memory device 304 and/or the I/O device 318 can be communicatively coupled to a hypervisor 330 which can have a number of virtual machines (VMs) 331-1, 332-2, 332-3 to 332-X running thereon. A VM refers generally to an isolated end user space instance, which can be executed within a virtualized environment. Other technologies aside from hardware virtualization can provide isolated end user space instances are contemplated within the scope of the disclosure as well. For example, a container can run on a host operating system without a hypervisor 330 or separate operating system, such as a container that runs within Linux. A container can be provided by a VM that includes a container virtualization layer (e.g., Docker). VMs, in some embodiments, operate with their own guest operating systems on a host using resources of the host virtualized by virtualization software (e.g., a hypervisor 330, virtual machine monitor, etc.). The tenant (i.e., the owner of the VM) can choose which applications to operate on top of the guest operating system. Some containers, on the other hand, are constructs that run on top of a host operating system without the need for a hypervisor 330 or separate guest operating system.

In some embodiments, the VMs 332-1 to 332-X can receive or generate memory access requests that involve data that is either written to or read from the memory device 304 (e.g., written to or read from the non-persistent memory components 206-1 to 206-N and/or the persistent memory component 2008-1 to 208-M illustrated in FIG. 2, herein). In general, such memory access requests sporadic in nature. For example, some access requests received or generated by the VMs 332-1 to 332-X can occur quickly (e.g., on the order of milliseconds to seconds) while other access requests received or generated by the VMs 332-1 to 332-X can occur at slower intervals or rather infrequently (e.g., on the order of days to months).

Accordingly, the memory device 304 (e.g., the control circuitry 320) can monitor such access requests to determine characteristics of the access request (or data associated with the access requests). As described herein, the control circuitry 320 can selectively divert some access requests to the persistent memory components while executing other access requests using the non-persistent memory components. For example, the control circuitry 320 can execute access requests that occur quickly using the non-persistent memory components and can execute access requests that occur at slower intervals or rather infrequently using the persistent memory components. As described herein, when the control circuitry 320 executes an access request using the persistent memory components, the control circuitry 320 can refrain from indicating to the I/O device 318 that such access requests have been diverted from the non-persistent memory components to the persistent memory components.

As a result, when data that has been diverted to the persistent memory component is requested again (e.g., by the I/O device 318 and/or one of the VMs 332-1 to 332-X), the control circuitry 320 can generate signaling (e.g., an interrupt message or other such command) indicating to the I/O device 318 that there will be a delay in retrieving the requested data. This is because, as described above, the persistent memory components generally do not operate in a deterministic fashion as the non-persistent memory components do. As mentioned above, because the I/O device 318 has no knowledge that the access request was diverted to the persistent memory components by the control circuitry 320, the control circuitry 320 therefore has to inform the I/O device 318 that a delay due to the non-deterministic behavior of the persistent memory components will occur prior to the access request being fulfilled.

In a non-limiting example, a system (e.g., the computing system 100 illustrated in FIG. 1) can include a virtual machine (VM) 332 and a memory device 304 coupled to the VM 332. The memory device 304 includes a non-persistent memory component (e.g., the non-persistent memory component(s) 106/206 illustrated in FIGS. 1-2, herein) and a persistent memory component (e.g., the persistent memory component(s) 108/208 illustrated in FIGS. 1-2, herein).

As shown in FIG. 3, the memory device 304 further include an input/output (I/O) device 318. The I/O device 318 can receive a memory access request that is directed to the non-persistent memory component from the VM 332. For example, the memory access request can specify a location in the non-persistent memory component at which the memory access is to be executed and/or the I/O device 318 can request that the memory access request is executed using the non-persistent memory component. In some embodiments, the I/O device 318 can append data (e.g., I/O device data, NIC data, etc.) to the memory access request.

The system can further include control circuitry 320 that is coupled to I/O device 318, the non-persistent memory component, and the persistent memory component. The control circuitry 320 can receive the memory access request including the I/O device data and determine characteristics of data associated with the memory access request that includes the I/O device data. As discussed herein, the characteristics of the data associated with the memory access request can include a predicted amount of time that the data corresponding to the memory access request that includes the I/O device data will be stored by the memory device 304. In such embodiments, the control circuitry 320 can monitor memory access requests that are similar in scope to the memory access request that includes the I/O device data to determine a predicted amount of time that data corresponding to the memory access request that includes the I/O device data is stored by the memory device 302 and determine the characteristics of the data associated with the memory access request that includes the I/O device data based on the predicted amount of time that the data corresponding to the memory access request that includes the I/O device data is stored by the memory device 304.

Continuing with this example, the control circuitry 320 can execute the memory access request using the non-persistent memory component in response to determining that the characteristics of the data meet a first criterion and execute the memory access request using the persistent memory component resident on the memory device in response to determining that the characteristics of the data meet a second criterion. In some embodiments, the first criterion can represent that the characteristics of the data are below a threshold data characteristic value while the second criterion can represent that the characteristics of the data are above a threshold data characteristic value.

In some embodiments, the control circuitry 320 can include a data structure (e.g., the data structure 228 illustrated in FIG. 2, herein) that can be configured to store address information corresponding to the I/O device data. The control circuitry 320 can, in such embodiments, write the address information corresponding to the I/O device data to the data structure responsive to receipt of the memory access request including the I/O device data.

In some embodiments, the system can include a communication system (e.g., the NOC 108/208 illustrated in FIGS. 1-2, herein) resident on the memory device 304 and coupled to the control circuitry 320, the I/O device 318, the non-persistent memory component, and the persistent memory component. In such embodiments, the control circuitry 320 can perform sequencing operations to write data associated with memory access requests received from the I/O device 318 to the non-persistent memory component or the persistent memory component, or both.

Continuing with this example, the control circuitry 320 can receive the memory access request including the I/O device data subsequent to receipt of a plurality of preceding memory access requests that each include respective I/O device data. The control circuitry 320 can perform one or more machine learning operations or one or more artificial intelligence operations using the plurality of preceding memory access requests that each include respective I/O device data to determine a predicted amount of time that data corresponding to the memory access request that includes the I/O device data is stored by the memory device 304. Using this information, the control circuitry 320 can determine the characteristics of the data associated with the memory access request that includes the I/O device based on the predicted amount of time that data corresponding to the memory access request that includes the I/O device data is stored by the memory device 304.

Figure 4:
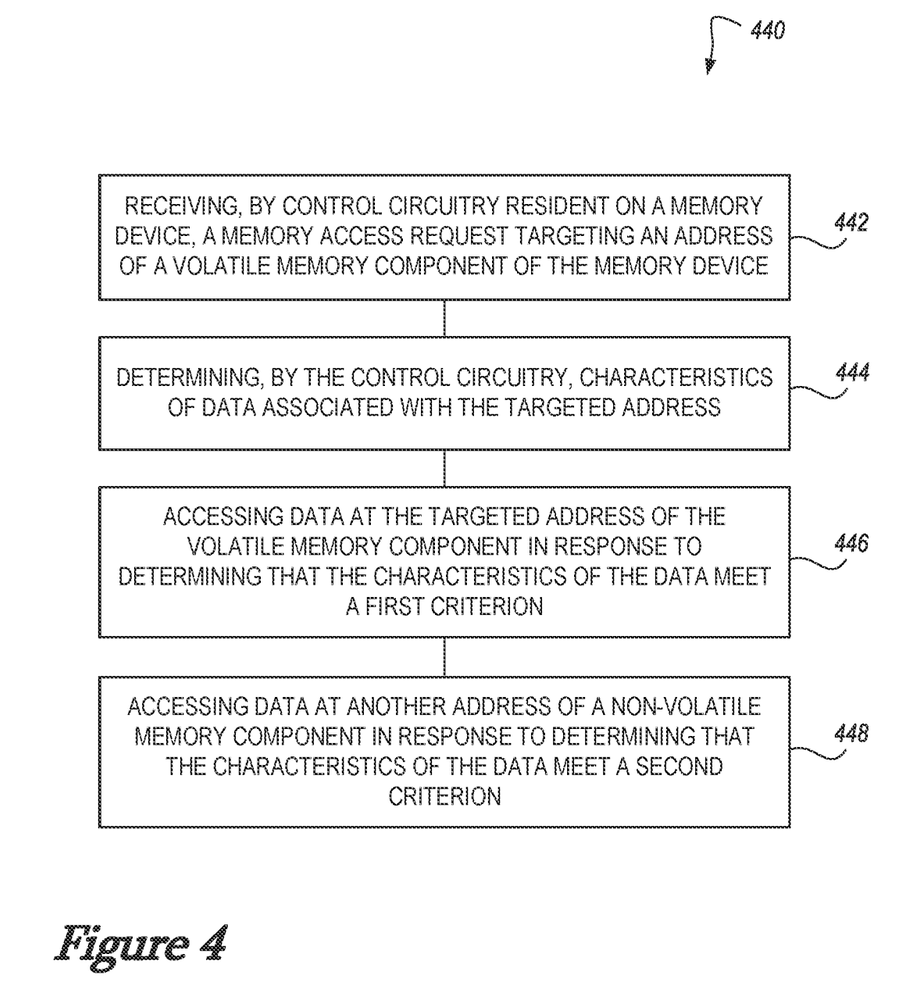
FIG. 4 is a flow diagram representing an example method for memory access control in accordance with a number of embodiments of the present disclosure.

FIG. 4 is a flow diagram representing an example method 440 for memory access control in accordance with a number of embodiments of the present disclosure. The method 440 can be performed by processing logic that can include hardware (e.g., processing unit(s), processing device(s), control circuitry, dedicated logic, programmable logic, microcode, hardware of a device, and/or integrated circuit(s), etc.), software (e.g., instructions run or executed on a processing unit), or a combination thereof. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 442, the method 440 can include receiving, by control circuitry resident on a memory device, a memory access request targeting an address of a volatile memory component of the memory device. For example, the method 440 can include receiving, by control circuitry resident on a memory device, a memory access request involving a non-persistent memory component of the memory device. For example, the method 440 can include receiving a memory access request that specifies a location (e.g., a targeted memory address) in the volatile or non-persistent memory device. The control circuitry can be analogous to the control circuitry 120/220/320 illustrated in FIGS. 1-3, herein, the memory device can be analogous to the memory device 104/204/304 illustrated in FIGS. 1-3, herein, and the volatile or non-persistent memory component can be analogous to the non-persistent memory components 106/206 illustrated in FIGS. 1-2, herein. In some embodiments, the method 440 includes receiving the memory access request from a virtual machine, such as one of the virtual machines 332 illustrated in FIG. 3, herein.

At operation 444, the method 440 can include determining, by the control circuitry, characteristics of data associated with the targeted address. For example, the method 440 can include determining, by the control circuitry, characteristics of data associated with a memory access request. As described above, the characteristics of the data can include memory access frequencies determined to be associated with the data and/or the corresponding memory access request. For example, the characteristics of the data associated with the memory access request can include a predicted amount of time that the data will be stored by the memory device. Embodiments are not so limited, however, and in some embodiments, the characteristics associated with the data and/or the memory access request itself can include information indicating whether similar memory access requests generally occur frequently or infrequently, as described above. Further, in at least one embodiment, the characteristics associated with the data and/or the memory access request itself can include whether the memory access request involves a virtual machine (e.g., one of the virtual machines 332 illustrated in FIG. 3, herein) or a physical host computing device.

At operation 446, the method 440 can include accessing data at the targeted address of the volatile memory component in response to determining that the characteristics of the data meet a first criterion. For example, the method 440 can include executing the memory access request using the non-persistent memory component resident on the memory device in response to determining that the characteristics of the data meet a first criterion. In some embodiments, the first criterion can be analogous to a data characteristic value being less than the threshold data characteristic value described above.

At operation 448, the method 440 can include accessing data at another address of a non-volatile memory component in response to determining that the characteristics of the data meet a first criterion. For example, the method 440 can include executing the memory access request using a persistent memory component (e.g., one of the persistent memory components 108/208 illustrated in FIGS. 1-2, herein) resident on the memory device in response to determining that the characteristics of the data meet a second criterion. In some embodiments, the first criterion can be analogous to a data characteristic value being greater than the threshold data characteristic value described above.

As described above, in some embodiments, the method 440 can include receiving I/O device data, such as network interface card data, as part of receiving the memory access request. In such embodiments, the I/O device can be analogous to the I/O device 118/218/318 illustrated in FIG. 1-3, herein.

The method 440 can further include executing the memory access request involving the non-volatile or persistent memory component without notifying an I/O device, such as a network interface card coupled to the control circuitry. For example, the method 440 can include selectively diverting the memory access request to non-volatile or persistent memory (despite the original memory access request specifying volatile or non-persistent memory, such as the non-persistent memory 106/206 illustrated in FIGS. 1-2, herein) without notifying the I/O device that the memory access request has been diverted to the non-volatile or persistent memory.

In some embodiments, the method 440 can include executing the memory access request using the non-volatile or persistent memory component by transferring the data to the non-volatile or persistent memory component via a network-on-a-chip (e.g., the NOC 110/210 illustrated in FIGS. 1-2, herein) coupling the control circuitry to the non-volatile or persistent memory component and the volatile or non-persistent memory component.

The method 440 can further include analyzing, by the control circuitry, a plurality of memory access requests over time, determining characteristics of each of the memory requests, and determining the characteristics of data associated with the memory access request based on the determined characteristics of the plurality of memory access requests. For example, the control circuitry can monitor a frequency of memory access requests that are the same or similar over time to predict and/or determine the characteristics of particular memory access requests. Embodiments are not so limited, however, and in some embodiments, the control circuitry can monitor an amount of time that data that corresponds to memory access requests that are the same or similar is stored in the memory device to predict and/or determine the characteristics of particular memory access requests. As described above, the control circuitry can, in some embodiments, analyze the memory access requests over time using one or more machine learning or artificial intelligence techniques to predict the characteristics of particular memory access requests.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
receiving, by control circuitry resident on a memory device, a memory access request from an input/output (I/O) device targeting an address of a volatile memory component of the memory device;
determining, by the control circuitry, characteristics of data associated with the targeted address;
accessing data at the targeted address of the volatile memory component in response to determining that the characteristics of the data meet a first criterion; and
accessing data at another address of a non-volatile memory component in response to determining that the characteristics of the data meet a second criterion, wherein the control circuitry provides a notification to the I/O device that execution of a command to access the data in the non-volatile memory component will take an amount of time greater than an amount of time associated with performance of a deterministic read operation.

2. The method of claim 1, further comprising receiving network interface card data as part of receiving the memory access request.

3. The method of claim 1, wherein the characteristics of the data associated with the memory access request comprise a predicted amount of time that the data will be stored by the memory device.

4. The method of claim 1, further comprising executing the memory access request involving the non-volatile memory component without notifying a network interface card coupled to the control circuitry.

5. The method of claim 1, further comprising receiving the memory access request from a virtual machine.

6. The method of claim 1, further comprising executing the memory access request using the non-volatile memory component by transferring the data to the non-volatile memory component via a network-on-a-chip coupling the control circuitry to the non-volatile memory component and the volatile memory component.

7. The method of claim 1, further comprising:
analyzing, by the control circuitry, a plurality of memory access requests over time;
determining characteristics of each of the memory requests; and
determining the characteristics of data associated with the received memory access request based on the determined characteristics of the plurality of memory access requests.

8. An apparatus, comprising:
a volatile memory component;
a non-volatile memory component coupled to the volatile memory component;
a network interface card (NIC); and
control circuitry coupled to the NIC, the volatile memory component, and the non-volatile memory component, wherein the control circuitry is configured to:
receive a plurality of memory access requests from the NIC;

analyze the memory access requests to determine characteristics associated with data corresponding to memory access requests among the plurality of memory access requests;

access data associated with a particular memory access request in response to a determination that the characteristics associated with the data are below a threshold data characteristic value; and access data associated with the particular memory access request using the non-volatile memory component in response to a determination that the characteristics associated with the data are above the threshold data characteristic value, wherein the control circuitry is further configured to receive signaling indicative of a read operation involving data associated with the particular memory access request that was accessed using the non-volatile memory component; and inform the NIC that execution of the read operation will take an amount of time greater than an amount of time associated with performance of a deterministic read operation.

9. The apparatus of claim 8, wherein the control circuitry is configured to access the data associated with the particular memory access request using the non-volatile memory component while refraining from transferring signaling indicating to the NIC that the particular memory access request is accessed using the non-volatile memory component.

10. The apparatus of claim 8, wherein:

the control circuitry comprises a data structure configured to store address information corresponding to the plurality of memory access requests received from the NIC, and the control circuitry is configured to write the address information to the data structure responsive to receipt of the plurality of memory access requests from the NIC.

11. The apparatus of claim 8, wherein the control circuitry comprises a sequencer, and wherein the sequencer is configured to manage memory access requests and command sequencing for the NIC, the volatile memory component, and the non-volatile memory component.

12. The apparatus of claim 8, wherein the control circuitry is configured to:

determine, based on the determined characteristics associated with the data corresponding to the memory access requests, a predicted amount of time that the data will be stored by the volatile memory component or the non-volatile memory component; and determine the threshold data characteristic value based on the determined predicted amount of time that the data will be stored by the volatile memory component or the non-volatile memory component.

13. The apparatus of claim 8, wherein the NIC is configured to receive the plurality of memory access requests from a virtual machine.

14. The apparatus of claim 8, wherein the control circuitry is further configured to:

transfer the data associated with the particular memory access request that was executed using the non-volatile memory component to the volatile memory component subsequent to informing the NIC of the read operation will take the amount of time greater than the amount of time associated with performance of the deterministic read operation; and transfer the data associated with the particular memory access request from the volatile memory component to the NIC.

15. An apparatus, comprising:

a non-persistent memory component;

a persistent memory component coupled to the non-persistent memory component;

an input/output (I/O) device; and control circuitry coupled to the I/O device, the non-persistent memory component, and the persistent memory component, wherein the I/O device is configured to:

receive a command to access data that was previously targeted to be written to the non-persistent memory component; and transfer the command to access the data to the control circuitry, and wherein the control circuitry is configured to:

determine that the data has been written to the persistent memory component based on characteristics of the data;

inform the I/O device that execution of the command to access the data will take an amount of time greater than an amount of time associated with performance of a deterministic read operation;

transfer the data from the persistent memory component to the non-persistent memory component subsequent to informing the I/O device that execution of the command to access the data will take the amount of time greater than the amount of time associated with performance of the deterministic read operation; and transfer the data from the non-persistent memory component to the I/O device.

16. The apparatus of claim 15, wherein the control circuitry, I/O device, the non-persistent memory component, and the persistent memory component comprise a pool of computing resources accessible by a virtual machine.

17. The apparatus of claim 15, wherein prior to receipt of the command to access the data, the control circuitry is configured to divert the data that was previously targeted to be written to the non-persistent memory component to the persistent memory component based on characteristics of the data.

18. The apparatus of claim 17, wherein the control circuitry is further configured to divert the data to the persistent memory component without notifying the I/O device that the data has been diverted to the persistent memory component.

19. The apparatus of claim 15, wherein the characteristics of the data include a predicted amount of time between memory access requests that involve data that is similar to the data indicated by the command.

20. A system, comprising:

a virtual machine (VM);

a memory device communicatively coupled to the VM and comprising:

a non-persistent memory component;

a persistent memory component coupled to the non-persistent memory component;

an input/output (I/O) device configured to:

receive a memory access request directed to the non-persistent memory component from the VM; and append I/O device data to the memory access request; and control circuitry coupled to the I/O device, the non-persistent memory component, and the persistent memory component, wherein the control circuitry is configured to:
- receive the memory access request including the I/O device data;
- determine characteristics of data associated with the memory access request that includes the I/O device data;
- execute the memory access request using the non-persistent memory component in response to determining that the characteristics of the data meet a first criterion; and
- execute the memory access request using the persistent memory component resident on the memory device in response to determining that the characteristics of the data meet a second criterion, wherein the control circuitry is further configured to provide a notification to the I/O device that execution of a command to access the data in the persistent memory component resident on the memory device will take an amount of time greater than an amount of time associated with performance of a deterministic read operation.

21. The system of claim 20, wherein the control circuitry comprises a data structure configured to store address information corresponding to the I/O device data, and wherein the control circuitry is configured to write the address information corresponding to the I/O device data to the data structure responsive to receipt of the memory access request including the I/O device data.

22. The system of claim 20, wherein the control circuitry is configured to:
- monitor memory access requests that are similar in scope to the memory access request that includes the I/O device data to determine a predicted amount of time that data corresponding to the memory access request that includes the I/O device data is stored by the memory device; and
- determine the characteristics of the data associated with the memory access request that includes the I/O device data based on the predicted amount of time that the data corresponding to the memory access request that includes the I/O device data is stored by the memory device.

23. The system of claim 20, wherein the control circuitry is configured to:
- receive the memory access request including the I/O device data subsequent to receipt of a plurality of preceding memory access requests that each include respective I/O device data;
- perform one or more machine learning operations or one or more artificial intelligence operations using the plurality of preceding memory access requests that each include respective I/O device data to determine a predicted amount of time that data corresponding to the memory access request that includes the I/O device data is stored by the memory device; and
- determine the characteristics of the data associated with the memory access request that includes the I/O device based on the predicted amount of time that data corresponding to the memory access request that includes the I/O device data is stored by the memory device.

24. The system of claim 20, further comprising a communication system resident on the memory device and coupled to the control circuitry, the I/O device, the non-persistent memory component, and the persistent memory component, wherein the control circuitry is configured to perform sequencing operations to write data associated with memory access requests received from the I/O device to the non-persistent memory component or the persistent memory component, or both.

* * * * *